Aug. 13, 1957 R. W. BECKWITH 2,802,936

COMMUNICATION SYSTEM HAVING KEYED CARRIER TO FREQUENCY SHIFT CONVERSION

Filed March 7, 1952 2 Sheets-Sheet 1

Inventor:
Robert W. Beckwith,
by Merton D. Moore
His Attorney.

Aug. 13, 1957 R. W. BECKWITH 2,802,936

COMMUNICATION SYSTEM HAVING KEYED CARRIER TO FREQUENCY SHIFT CONVERSION

Filed March 7, 1952 2 Sheets-Sheet 2

Inventor:
Robert W. Beckwith,
by Merton D. Morse
His Attorney.

2,802,936

COMMUNICATION SYSTEM HAVING KEYED CARRIER TO FREQUENCY SHIFT CONVERSION

Robert W. Beckwith, Syracuse, N. Y., assignor to General Electric Company, a corporation of New York Application March 7, 1952, Serial No. 275,415

3 Claims. (Cl. 250—8)

My invention relates to high frequency receivers, and particularly to such receivers adapted to respond to wave pulses of predetermined carrier frequencies, which pulses may, for example, be received in accord with desired code combinations, selectively to effect certain desired operations.

Commonly such receivers employ resonant selective means such as tuned circuits, or filters, to select the frequency of the pulses to which the respective receiver is adapted to respond. Such resonant means require time, after initiation of a received pulse, to build up oscillations therein to the maximum strength attained therein during the period of the pulse. Similarly, upon termination of the received pulse the oscillations in said resonant selective means do not instantly terminate but continue through a period of decay dependent upon the decrement of the circuit. Thus the amplitude of the oscillations in the selective means is not a true representation of the received pulse.

An object of my invention is to provide in a high frequency receiver employing such resonant selective means, means for producing pulses more faithfully representing the form of the received high frequency pulses.

A further object of my invention is to provide such selective means in which the oscillations excited by received pulses occur at a different rate on termination of such pulses.

A still further object of the present invention is to provide means for minimizing the effect of delay in build-up and decay of waves in resonant selective detection circuits.

In carrying my invention into effect the resonant selective means is followed by one or more limiting amplifiers arranged to amplify oscillations a certain desired amount so as to provide a certain magnitude of output which is constant regardless of the magnitude of the voltage applied to the resonant selective means, thereby minimizing the effect of delay in build-up of oscillations in the resonant selective means. The limiting amplifiers are followed by a discriminator means having the characteristic of developing an output of one polarity at the frequency of the aforementioned pulses and an output of a different polarity at another frequency. The resonant selective means is arranged so that the aforementioned continuing oscillations occur at this other frequency. Accordingly, the occurrence of the aforementioned one polarity at the output of the discriminator coincides with the occurrence of the applied pulses of waves, thereby resulting in faithful reproduction of the received high frequency pulses.

Figure 1:
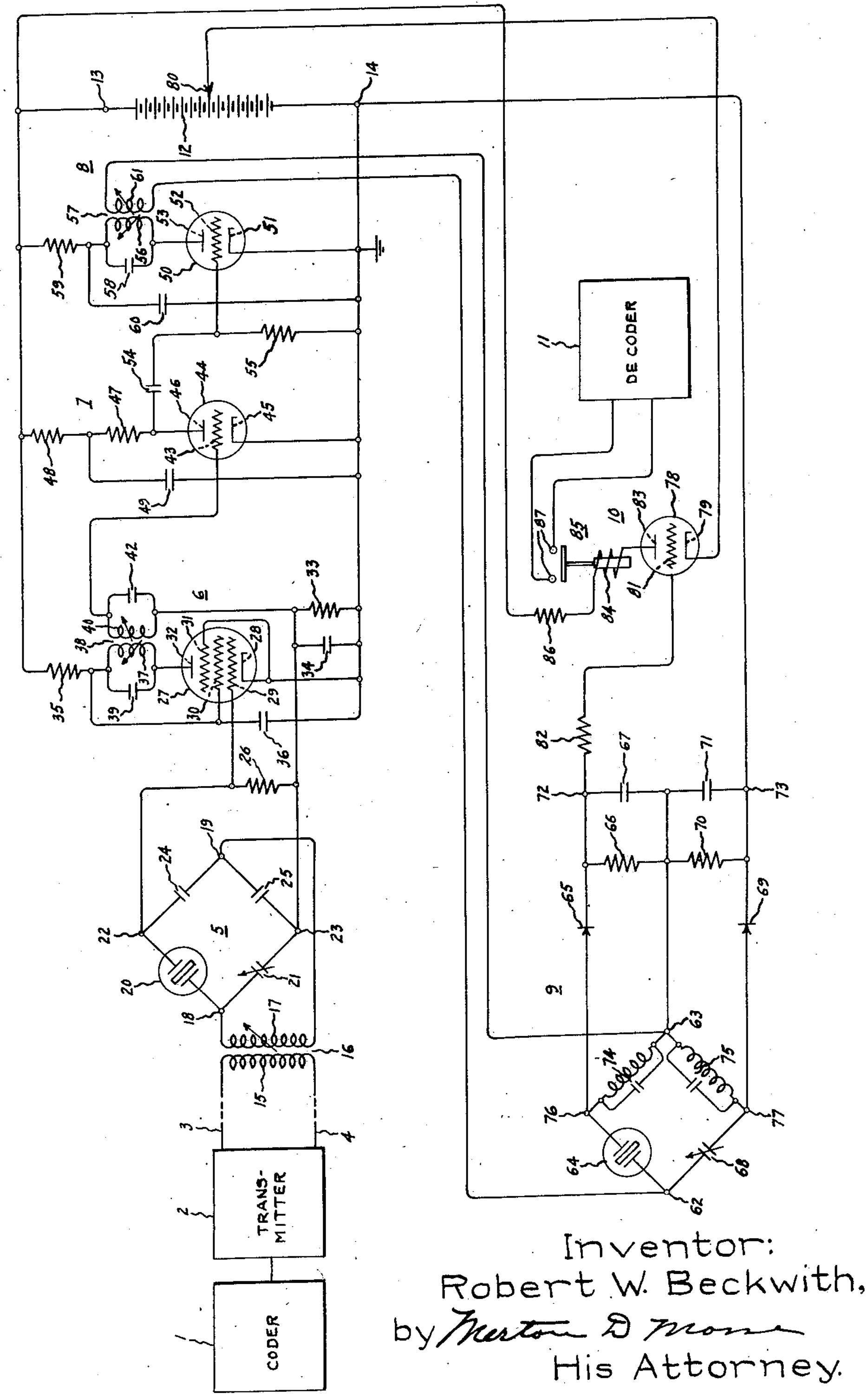
Figures 2A, 2B:
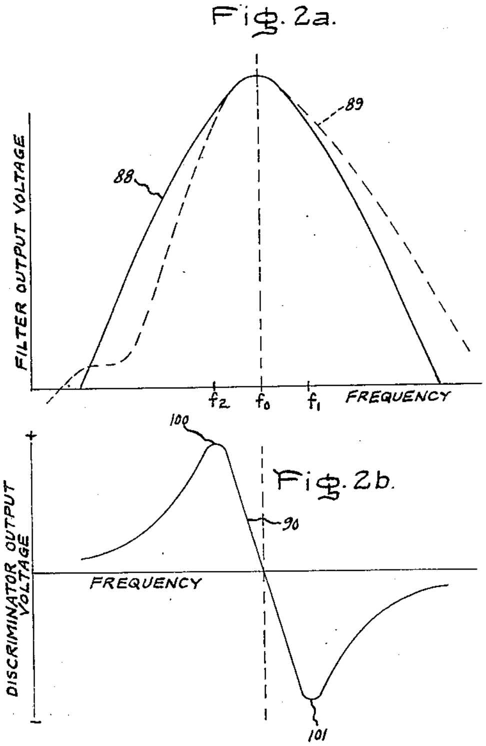

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a schematic representation of circuits embodying my invention; Figs. 2*a* and 2*b* show response curves for the filter and discriminator elements of the circuit of Fig. 1; Figs. 3*a* to 3*f* show graphs of waves useful in explaining the operation of the circuit of Fig. 1.

Referring now to Fig. 1, there is shown a carrier current control system of the kind described above. At the control station is located a coder 1 and a transmitter 2. The coder is actuated by operating personnel at the transmitting station to cause the transmitter to develop waves of substantially constant frequency modulated in accordance with a predetermined code. Waves from the transmitter pass over the dotted conductors 3 and 4, which in general represent high voltage power conductors and associated coupling equipment and which may also represent a space radio channel, to a receiver station.

At the receiver station is located a narrow-band filter 5, a carrier-wave amplifier 6, amplitude limiters 7 and 8, a frequency discriminator 9, a switching device 10 responsive to the changes in polarity of the output voltage from the discriminator 9, and a decoder 11 which initiates a predetermined action in response to a predetermined switching sequence performed by the switching device 10. These elements are interconnected in the order of recitation and include various electron discharge devices connected to a source 12 of operating voltage having a positive terminal 13 and a negative terminal 14 connected to ground.

At the receiver station waves from the channel represented by dotted conductors 3 and 4 are applied to the primary winding 15 of transformer 16. The secondary winding 17 of the transformer is connected between input terminals 18 and 19 of the filter 5 and becomes a necessary part of the filter as will be pointed out more fully below.

Filter 5 comprises a piezo-electric crystal element 20 and a variable capacitor 21 connected between the input terminal 18 and output terminals 22 and 23, respectively. The filter 5 also includes capacitors 24 and 25 connected between the input terminal 19 and output terminals 22 and 23, respectively. The capacitance of variable capacitor 21 is made substantially equal to the capacitance of the crystal element 20 at frequencies appreciably different from the resonant frequencies of the crystal element. Capacitance 24 is made substantially equal to capacitance 25. In the vicinity of the parallel and series resonant frequencies of the crystal element 20 corresponding in general to the band of frequencies which the filter 5 will transmit, the crystal element has very low and high impedance appreciably different from the impedances presented by variable capacitor 21 at these frequencies. Thus, in the vicinity of these frequencies, very appreciable output is obtained across the output terminals 22 and 23. At frequencies above and below these frequencies, the crystal element presents a value of capacitance substantially the same as the capacitance of capacitor 21, hence, since the impedances of the bridge circuit are balanced, substantially zero output is obtained at these other frequencies. The inductance of the secondary winding 17 of the transformer 16 is preferably made adjustable to resonate with the capacitances 21 and 25 at the frequency of the parallel resonance of crystal element 20. With this provision the inherently very narrow band pass characteristic of filter 5 can be widened to a certain desired degree. The characteristics of the filter described above are shown in Fig. 2 and will be more fully described below.

The output from the filter 5 appearing across resistance 26 connected between terminals 22 and 23 is applied to the amplifier 6 comprising electron discharge device 27 including a cathode 28, a grid 29, a screen grid 30, a suppressor grid 31 and an anode 32. Cathode 28 is connected to ground. Grid 29 is connected to terminal 22. Terminal 23 is connected through automatic volume control biasing resistance 33 bypassed by bypass capacitor 34 to ground. The screen grid 30 is connected through voltage dropping resistance 35 to the positive terminal 13 of unidirectional source 12, and also is connected through bypass capacitor 36 to the cathode 28. A parallel resonant circuit including the primary winding 37 of transformer 38 shunted by capacitor 39 is connected between anode 32 and screen 30. The output from amplifier 6 appearing across the secondary winding 40 of transformer 38 is applied to limiter 7 which includes electron discharge device 44. Secondary winding 40 is shunted by capacitor 42 to form a second parallel resonant circuit. The inductances of primary and secondary windings 37 and 40 are made variable to permit adjustment of the parallel resonant circuits associated therewith to the frequencies at which it is desired that the receiver operate. The secondary winding 40 has one end connected to output terminal 23 and the other end connected to grid 43 of electron discharge device 44.

Device 44 also has a cathode 45 connected to ground, and an anode 46 connected through load resistance 47 and decoupling resistance 48 to the positive terminal 13 of source 12. Decoupling capacitor 49 is connected between the junction of resistances 47 and 48, and ground. The output from limiter 7 is applied to limiter 8 which includes electron discharge device 50 having a cathode 51, a grid 52 and an anode 53. A coupling capacitor 54 is connected between grid 52 and anode 46. Grid leak biasing resistance 55 is connected between grid 52 and ground. Cathode 51 is connected to ground. A parallel resonant circuit, which includes the primary winding 56 of coupling transformer 57 shunted by capacitor 58, and resistance 59 are connected in series between anode 53 and the positive terminal 13 of source 12. The inductance of the primary winding 56 is made variable to permit tuning of the parallel resonant circuit to frequency of operation of the receiver. The end of resistance 59 adjacent anode 53 is bypassed to ground through capacitor 60.

The output from limiter 8 taken across the secondary winding 61 of transformer 57 is applied to input terminals 62 and 63 of discriminator 9. One branch circuit of the discriminator 9 includes a piezo-electric crystal element 64, a unilaterally conducted device 65 and a resistance 66 shunted by a filter capacitor 67 connected in series in the order of recitation between terminals 62 and 63. The discriminator 9 also includes a variable capacitor 68, a second unilaterally conducting device 69, a second resistance 70 shunted by a second bypass capacitor 71 connected in series in the order of recitation between terminals 62 and 63. Terminals 72 and 73 between the junction of elements 65 and 66, and between the junction of elements 69 and 70 are the output terminals of the discriminator. Terminal 73 is connected to ground. At the series and parallel resonant frequencies of the crystal element 64, the crystal element presents to the circuit low and high impedances, respectively. At frequencies below the series resonant frequency and above the parallel resonant frequency the crystal has a capacitative reactance which changes gradually with frequency. The variable capacitance 68 is adjusted so that it substantially equals this latter value of capacitance of the crystal element 64. Accordingly, at these latter frequencies above and below the resonant frequencies of the crystal element the unidirectional voltages developed across resistances 66 and 70 in respective branches of the discriminator circuit are substantially the same. Consequently, a net output of zero is obtained across output terminals 72 and 73 of the discriminator at these frequencies. A net output of zero is also obtained at a center frequency intermediate between the series and parallel resonant frequencies of the crystal element 64 since at this intermediate frequency the crystal element has a value of impedance such that equal unidirectional currents are produced through the resistances 66 and 67. However, at the series resonant frequency of the crystal element the impedance of the crystal element is considerably lower than the impedance of the variable capacitance 68; hence, the voltage appearing across resistance 66 is appreciably larger than the voltage across resistance 70. Thus, a net output of one polarity is developed between the output terminals 72 and 73. At the parallel resonant frequency of crystal element 64 the impedance of the crystal element 64 is considerably higher than the impedance of the capacitance 68; hence, at this frequency the voltage produced across the resistance 66 is considerably lower than the voltage produced across resistance 70. Thus a net output of the opposite polarity is developed between terminals 72 and 73. Accordingly, it is seen the discriminator will develop an output of one polarity when the frequency applied thereto lies on one side of a certain center frequency, and the discriminator will develop an output of the opposite polarity when the frequency applied thereto lies on the other side of the center frequency. The magnitude of these outputs will depend on the degree of separation of the applied frequency from the center frequency. These characteristics of the discriminator are shown in Fig. 2 and will be more fully described below.

Parallel resonant circuit 74 of discriminator 9 is connected between the input terminal 63 and the terminal 76 of device 65 adjacent element 64. The parallel resonant circuit 75 is connected between input terminal 63 and terminal 77 of device 69 adjacent variable capacitor 68. These parallel resonant circuits are in parallel resonance at a frequency substantially below the frequency of operation of the discriminator 9 and therefore appear as capacitors at the operating frequencies while at the same time providing unidirectional current return paths for the rectifier elements. The operation of this discriminator is more fully described in U. S. patent application, Serial No. 201,413, filed December 18, 1950, now U. S. 2,712,600, and assigned to the assignee of the present invention.

The output voltage from discriminator 9 is applied to switching device 10 which includes electron discharge device 78 having a cathode 79 connected to the variable potential point 80 on source 13, a grid 81 connected through resistance 82 to terminal 72, and an anode 83 connected through coil 84 of relay 85 and through anode resistance 86 to the positive terminal 13 of source 12. The contacts 87 of relay 85 are connected to a decoder 11. The potential of cathode 79 is made variable in order to permit adjustment of the value of output from discriminator 9 at which device 78 becomes conductive.

In Figs. 2*a* and 2*b* are shown graphs useful in explaining the operation of the circuit of Fig. 1 described in the preceding paragraphs. In Fig. 2*a* are shown graphs for crystal filter with the ordinate representing output voltage and the abscissa representing frequency. Graph 88 shows the output voltage characteristic vs. frequency of the filter 5 when the variable capacitor 21 is adjusted so that natural resonant frequency of the filter 5 occurs at the center frequency $f_0$. The graph 89 shows the output vs. frequency characteristic of the filter when the capacitor 21 is adjusted in a manner to cause the filter to have a natural resonant frequency of $f_1$. It will, of course, be understood that the filter 5 can also be made to have the natural resonant frequency of $f_1$ by shaping the crystal element in a manner to have slightly higher series and parallel resonant frequencies. It should be noted that these adjustments affect the band pass characteristics of the filter inappreciably while at the same time cause a change in the natural frequency of oscillation sufficient to be of value in a manner to be pointed out below. The frequency $f_2$ represents a predetermined frequency of operation of the receiver.

In Fig. 2*b* is shown graph 90 for crystal discriminator 9 with the ordinate representing output voltage and the abscissa representing frequency. Graph 90 shows the manner in which the output from the discriminator varies as the frequency of the signal applied to the input of the discriminator is varied.

The amplitude of peaks 100 and 101 of the graph 90 can be made substantially equal by adjustment of the inductance of secondary winding 61 of transformer. The symmetry of the graph 90, and particularly the symmetry of the portion of the graph 90 below and above frequencies corresponding to the peaks 100 and 101, respectively, is controlled principally by adjustment of variable capacitor 68.

Figures 3A, 3B, 3C, 3D, 3E, 3F:
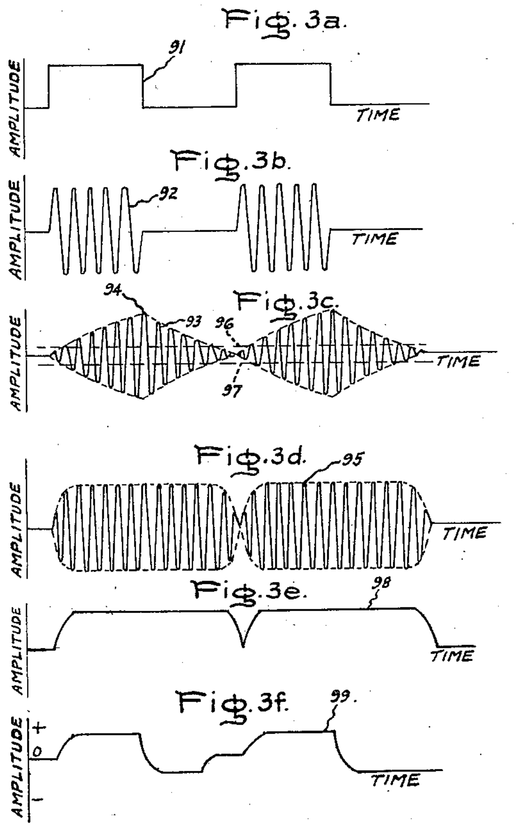

In Fig. 3 are shown graphs useful in explaining the operation of the circuits of Fig. 1. In each of these graphs the abscissa represents time and the ordinate represents amplitude. Graph 91 of Fig. 3*a* represents the code signal applied to the transmitter 2. Graph 92 of Fig. 3*b* represents trains of waves developed by the transmitter 2 in response to keying or modulation by the coder. It should be noted that while a few cycles of high frequency waves are shown in each train in the interest of clarity, actually very many cycles may occur in an actual transmission. In Fig. 3*c* graph 93 represents the voltage appearing at the output terminals of the filter 5 when waves of the form shown in Fig. 3*b* are applied to the input terminals of the filter 5. In this connection it should be noted that the voltage at output terminals of the filter builds up gradually a peak value 94 determined by the amplitude of the waves of Fig. 3*b* and then starts to decay at the instant the amplitude of the waves of Fig. 3*b* falls to zero in the manner shown, as is characteristic of high-Q circuits. In this connection it should be pointed out that the frequency of the waves of the decaying amplitude portion of the wave form is usually different from the frequency of rising portion because of the self-oscillation effect explained above. In Fig. 3*b* is shown a graph 95 representing the voltage appearing at the output of the limiter with the limiting action taking place along amplitude level 96 and 97 of Fig. 3*c*. In Fig. 3*e* is shown a graph 98 of the voltage vs. time that would be obtained by demodulation of the waves of Fig. 3*d* and represents the wave that would be obtained if a conventional amplitude modulation receiver were used for detection. In Fig. 3*f* is shown the demodulated wave form 99 obtained from a receiver made in accordance with the present invention.

Referring now to the operation of the circuits of Fig. 1, the transmitter 2 is keyed by the coder 1 in accordance with the code represented by graph 91 of Fig. 3*a* to develop trains of waves as shown in graph 92 of Fig. 3*b*. These waves have the predetermined frequency $f_2$ which the filter 5 is tuned to as shown on graph of Fig. 2*a*. An output of the kind shown in graph 93 of Fig. 3*c* appears at the output terminals of the filter 5. The rising portion of this wave has the same frequency as the frequency of the applied wave. The decaying amplitude portion of this wave has a frequency determined by the nautral resonant frequency of the filter circuit, since after a brief interval after the applied waves cease, the filter oscillates at its natural resonant frequency as pointed out above. If the output from this filter were amplified and then limited in amplitude a wave of the kind shown in graph 95 of Fig. 3*d* would be obtained. If this wave were applied to a conventional amplitude of modulation detector circuit, an output of the kind shown in graph 98 of Fig. 3*e* would be obtained. This output is considerably different from the original modulating code of Fig. 3*a* and represents a distortion which would render the demodulated wave useless to perform the function desired of it. In the present invention the output from the filter is applied to amplifier 6 which amplifies the output and then to the electron discharge limiters 7 and 8 which limit the amplitude of the output to a value corresponding to the level shown by lines 96 and 97 in Fig. 3*c*. The resulting train of waves is applied to the crystal discriminator 9.

The discriminator is adjusted so that at the predetermined frequency $f_2$ an output voltage corresponding to the peak 100 is developed and at the frequency $f_1$ an output voltage corresponding to peak 101 is developed. The crystal filter is adjusted to have a natural resonant frequency $f_1$. This may be done by adjusting capacitor 21 or by altering the crystal, for example, by grinding the crystal to a slightly higher resonant frequency without appreciably altering its operation in the filter, as pointed out above in connection with Fig. 2*a*. Accordingly, during the time of occurrence of the trains of waves of predetermined frequency $f_2$ an output of one polarity is developed between terminals 72 and 73 of the discriminator. Substantially at the instant the amplitude of the waves applied to the filter drops to zero, the filter 5 develops a voltage of frequency $f_1$ which causes an output of the opposite polarity to be produced across these terminals. Accordingly, the polarity of the output of the discriminator varies in substantially exact correspondence with the on and off condition of the transmitter causing the electron discharge device 78 to conduct during the on intervals of the transmitter to operate the relay which in turn actuates the decoder to produce the action required of the latter device.

Accordingly, it is seen that circuits which overcome the inherent disadvantages in the use of narrow band, high-Q filter elements have been provided. These circuits are simple in construction, yet efficient and highly effective in minimizing the inherent delay in build-up and decay of voltages in highly selective circuits.

In certain applications a discriminator of the kind described above has proved quite satisfactory as a filter as well as a discriminator. When used alone the crystal element of the discriminator is ground so that when in circuit with the other elements of the discriminator it will "ring" or resonate with other elements in the circuit, after the applied waves cease, at a frequency other than the applied frequency thereby producing a different output at this other frequency. This output may be utilized in the manner described above in connection with Fig. 1.

While I have shown a particular embodiment of my invention, it will, of course, be understood that I do not wish to be limited thereto since many modifications, both in the circuit arrangement and in the instrumentalities employed, may be made, for example, inductance and capacitance combinations and the like may be used in place of the piezo-electric elements, and I therefore contemplate by the appended claims to cover any such modifications as fall within the true spirit and scope of my invention.

What I claim as new and desire to secure by Letters Patents of the United States is:

1. In combination, in a pulse code communication system, a transmitter developing carrier waves of predetermined frequency modulated in amplitude by pulses, a receiver comprising selective resonant means tuned to a frequency slightly different from said predetermined frequency, means for applying the output of said transmitter to said receiver, whereby said modulated carrier waves build up forced oscillations in said selective means which oscillations, upon termination of the received pulses, have the frequency to which said selective means is tuned, and then gradually decay, a discriminator arranged to produce an unidirectional output of one polarity in response to oscillations having said predetermined frequency and an output of the opposite polarity in response to the frequency to which said selective means is tuned, and means to apply the output from said selective means to said discriminator.

2. In a pulse code communication system comprising means for developing a carrier wave having a predetermined frequency, means for interrupting said carrier wave in accordance with a predetermined code, a receiver including filter means having resonant circuit elements delaying the rise in amplitude of said waves at the output of said filter and causing other waves of decaying amplitude to be developed after the cessation of said waves, the resonant elements of said filter having a natural frequency different from said predetermined frequency whereby said other waves have another frequency, a frequency discriminator means for developing one output in response to waves of said predetermined frequency and for developing another output in response to waves of said other frequency, whereby said discriminator develops said one output only during the reception of carrier waves from said source by said receiver.

3. The combination, in a pulse code communication system, of a transmitter for supplying trains of carrier waves of predetermined frequency, a receiver having filter means including resonant circuit elements tuned to pass said predetermined frequency, said resonant circuit elements delaying the rise in amplitude of said waves at the output of said filter and causing other waves of decaying amplitude to be developed after the cessation of said waves, the resonant elements of said filter having a natural resonant frequency different from said predetermined frequency whereby said other waves have another frequency, a frequency discriminator means for developing an output of one polarity in response to waves of said predetermined frequency and for developing an output of the opposite polarity in response to waves of said other frequency, whereby said discriminator develops output of said one polarity only during the occurrence of said trains of waves, thereby detecting the occurrence of said trains of waves.

References Cited in the file of this patent

UNITED STATES PATENTS

| | | |
|---|---|---|
| 2,115,676 | Wheeler | Apr. 26, 1938 |
| 2,154,398 | Crosby | Apr. 11, 1939 |
| 2,369,621 | Travis | Feb. 13, 1945 |
| 2,374,735 | Crosby | May 1, 1945 |
| 2,520,621 | Beers | Aug. 29, 1950 |
| 2,539,637 | Sands | Jan. 30, 1951 |
| 2,601,340 | Stachura | June 24, 1952 |
| 2,654,841 | Dutton | Oct. 6, 1953 |

FOREIGN PATENTS

| | | |
|---|---|---|
| 293,446 | Great Britain | May 9, 1929 |